Sept. 12, 1961  J. F. KUZMICK ET AL  2,999,309
COMPOSITE METAL ARTICLE AND METHOD OF PRODUCING
Filed April 6, 1955
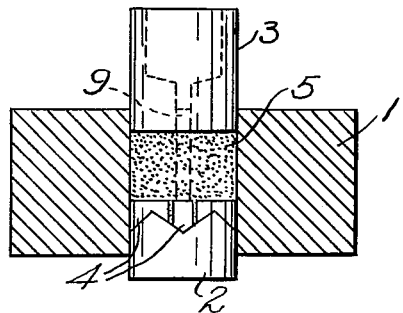
Fig. 1
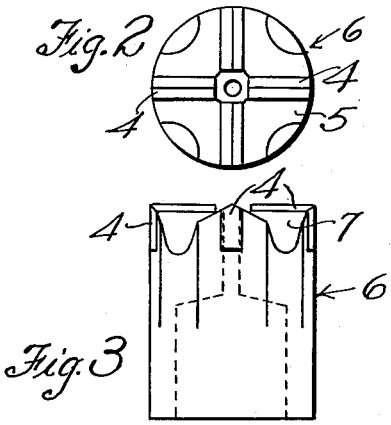
Fig. 2
Fig. 3
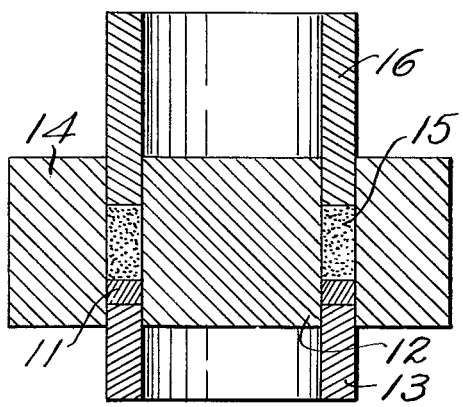
Fig. 4
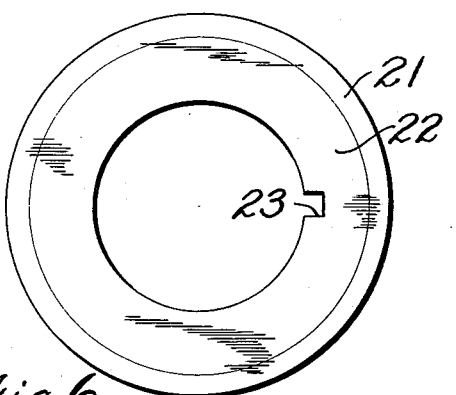
Fig. 6
Fig. 5
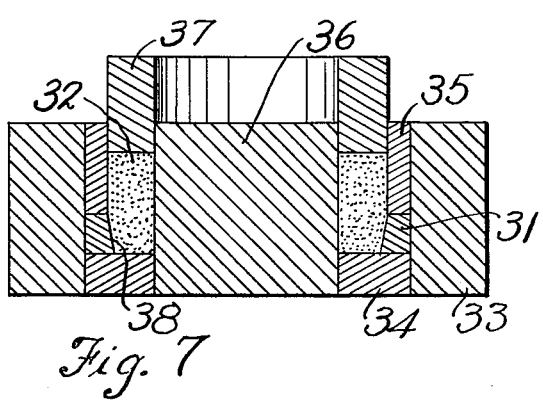
Fig. 7
JEROME F. KUZMICK
JAN M. KROL
INVENTORS
BY Darby & Darby

2,999,309
COMPOSITE METAL ARTICLE AND METHOD OF PRODUCING

Jerome F. Kuzmick, Upper Montclair, N.J., and Jan M. Krol, New York, N.Y., assignors to Welded Carbide Tool Company, Inc., Clifton, N.J., a corporation of New Jersey Filed Apr. 6, 1955, Ser. No. 499,591
13 Claims. (Cl. 29—194)

This invention relates generally to methods of producing composite metal articles made out of materials which possess different physical and technological properties.

More particularly, this invention relates to making composite articles of hard metals, currently widely used as tool and wear- or heat-resistant materials, and steel or similar strong and ductile materials which provide base, support or casing for the former. Such hard metals comprise carbides, nitrides, borides and silicides of the transition metals of the fourth and sixth groups of the periodic systems. Typical representatives of these metals are tungsten, titanium, tantalum, molybdenum, zirconium and chromium.

Hard metals are generally processed by techniques of powder metallurgy as metal-bonded or cemented products, i.e., combinations of carbides such as tungsten carbide, titanium carbide and tantalum carbide with binder metals such as cobalt and nickel, known as cemented carbides. Due to their specific properties, such as high hardness values, high modulus of elasticity, high melting point, high wear-resistance and cutting characteristics, cemented carbides, and particularly tungsten carbide, have been used for production of cutting and shearing tools, swaging, drawing, stamping, molding or forming dies and wear-resistant parts. By nature, however, these materials are inherently brittle and not suitable by themselves to function as the entire tool or die for several reasons. For example, such tools made of hard metals are often not practicable because of the stresses set up in service, and also because of the excessive expense involved in making them.

It has, therefore, been found desirable that only the section required for the cutting, forming, or wear-resistant surface or surfaces be made of the hard metal. For those reasons, only segments or inserts of such hard metals are attached to a supporting shank or casing which is usually of carbon or alloy steel and in some instances of non-ferrous alloys as brass or bronze.

Up to the present time, considerable difficulties have been encountered in attaching hard metal inserts to a steel or bronze shank or casing. The usual methods involve mechanical clamping or soft soldering, brazing, shrink fit of the supporting material around the hard metal, press fit of the hard metal into the supporting metal or forging of a casing around the hard metal. None of these prior methods provides a strong direct bond between the hard metal and the supporting metal, so that the joint is usually the weakest part of the tool or die. As a result, when severe stresses are encountered in service, the hard metal inserts often separate or break off from the holder before the normal useful life of the tool has been expended. This undesirable condition is particularly true on severe applications, such as carbide tipped mining tools, milling cutters for automatic high speed milling machines, and forming dies for automatic presses. The said conventional methods of attaching hard metal to supporting metal are often laborious and expensive in addition to being insufficiently permanent when the composite article is used under industrial conditions. Furthermore, complicated fitting and similar expensive mechanical operations are required. For example, when it is desired to produce a complex milling cutter containing a plurality of carbide tips by brazing the tips to the shank, it has been necessary to carefully machine the supporting surface and grind the corresponding carbide surfaces so that they mate perfectly to insure positive contact, then the tips and the brazing material must be carefully disposed in the recesses of the shank, and accurately wired or clamped in place to insure sufficient contact throughout the brazing operation. Even with these precautions, improper brazing often occurs, resulting in premature loss of the tip and other damage to the cutter.

Even when an apparently good brazed joint is obtained between steel and cemented carbide, there is danger of the carbide cracking because of the difference in coefficient of thermal expansion between the steel and the carbide and the brazing material. Most cemented carbide compositions have a coefficient of expansion about one-half that of ordinary steel alloys. Thus, for example, if a carbide ring is brazed onto a steel ring, the latter expands more during the heating accompanying the operation than does the carbide. As the assembly cools, the steel ring therefore tends to shrink to a greater extent than the carbide. As a result, severe hoop stresses are set up in the carbide ring, often causing it to crack either during cooling or subsequently. For this reason, applications involving attachment by brazing of carbide rings to steel rings or shanks are limited to relatively small diameters only, or to assemblies where a carbide ring made up of several segments may be used.

One of the prime objects of the present invention is to provide a new and better method of bonding hard metal insert or inserts into a supporting body. This method involves among other things the forming of an intermediate layer of a suitable alloy between the hard metal and steel. The bonding alloy, the properties of which will be apparent from the following detailed description, is applied in powder form, and the methods of forming the layer are those of hot pressing or infiltration. Hard metal insert or inserts are placed in a suitably prepared mold, for example, a specially prepared ceramic or graphite mold, which may be of simple design and may be readily manufactured at a minimum of expense: thus eliminating intricate and expensive machining operations on the steel shank. As the metal powder layer is compressed around the hard metal inserts, the complicated operation of fitting and grinding of the inserts and steel body can thus be eliminated. Furthermore, by a properly selected composition of the joining alloy in accordance with the present invention, the stresses set up by differential coefficient of thermal expansion are minimized.

The method of the present invention comprises essentially the hot molding of the shank or holding material or interposed holding material from metal powder around or adjacent to the cemented carbide or hard metal insert or inserts disposed in a suitable die. Certain alloys produced by hot pressing metal powders have adequate physical properties for use as the shank or holding material of the tool or die or other composite article to be formed. When these metal powders are hot pressed against a cemented carbide insert such as tungsten carbide and at a temperature sufficient to cause a liquid phase in the powder alloy mixture, a remarkably strong bond is developed between the hard metal and the hot pressed shank material.

In the present invention, not only is a better metallurgical bond obtained between the carbide and shank material, but the stresses set up by differential coefficient of expansion are minimized by special alloying procedures. In addition to controlling expansion, coefficient and joining properties, another object is to supply metal powder alloy holding material of special properties as required by the specific applications. Examples of such properties are wear resistance, heat conductivity, machinability and hardness or rigidity. These properties are specifically attained in the examples appearing below.

In the conventional brazing of carbide to steel, materials such as copper or silver solder or copper-nickel, are commonly used. The tenacity of the tungsten carbide bond secured by such alloys is rather poor due to low solubility or surface wetting and for that reason the strength of the interface between the brazing material and the tungsten carbide is not very high. It would be very desirable to use alloys of the elements iron, cobalt or nickel of group VIII of the periodic table as brazing or welding materials, as these metals have higher solubility for tungsten carbide and therefore a strong metallurgical bond would result if contamination could be avoided. However, if one attempted to do this by the conventional method of melting the brazing or welding material, the temperature would be so high that it would ruin the surface of the steel to which the carbide was being bonded, either by overheating causing crystalline failure or by actual local melting of the steel surface. Furthermore, uncontrolled excessive diffusion of tungsten carbide into the molten welding material would result in embrittlement of the joint.

In the present invention, advantage is taken of the possibility of obtaining a good joint between tungsten carbide and alloys of iron, nickel or cobalt, by the application of heat and pressure to powdered alloys of these elements in contact with tungsten carbide. It has been found that certain mixtures of elementary powders or alloy powders, particularly iron base powders, can be hot pressed to form strong, dense, durable bodies suitable for holding materials for tungsten carbide tips or other shaped hard metal pieces. Hot pressing is accomplished at temperatures ranging from about 2000° F. to about 2500° F. and at pressures ranging from 500 to 4000 p.s.i., although pressures in excess of 1000 p.s.i. are usually required. Consolidation of the powder mixture to a dense compact is further expedited if one of the minor ingredients is present in the liquid phase during the hot pressing operation so as to render the powder mass more plastic and therefore more susceptible to compaction.

Under the conditions described, when hot pressing of the powder mass is done while it is in contact with a tungsten carbide surface, an excellent metallurgical bond is obtained between the two surfaces, far surpassing what ordinarily would be expected. While the present invention is not predicated upon any particular theory, the attained superiority may be due to the following factors:

(a) Under the conditions of heat and pressure described, sufficient diffusion between the tungsten carbide and the powder mass takes place to establish a good metallurgical bond. This may be further enhanced by the transitory presence of a small amount of liquid phase, which is then absorbed by the powder mass. At the same time, excessive diffusion of carbide into the bonding metal does not occur, as would be the case where the bonding metal is completely liquid, as in the case of ordinary welding.

(b) Since the powder mass is being formed by heat and pressure in contact with the tungsten carbide section, perfect contact between mating surfaces is obtained, much better than would ordinarily be true of two machined surfaces being brazed or welded together.

(c) The temperatures used (2000–2500° F.) are sufficiently high so that slight plasticity of the tungsten carbide may occur, with consequent susceptibility to welding to adjacent surfaces, particularly under pressure.

(d) Since the operation occurs in a confined mold, there is little opportunity for oxidation or other contamination of the mating surfaces to occur.

During the hot press process, if pressure is transmitted to the powder by means of a steel shank, simultaneous bonding will occur between the carbide and the powder alloy on one end, and between the powder alloy and the steel shank on the other end. In this way, a composite body consisting of the three materials can be produced.

The powder metal-carbide holding material can be very precisely proportioned to meet the requirements of the process as far as coefficient of expansion is concerned. According to this invention, this result can be accomplished in any of the three following ways:

(a) By use of special powder metal alloy matrix with low or intermediate coefficient of expansion, for example an iron base alloy powder;

(b) By additives of materials such as tungsten, molybdenum, or carbides or other compounds of these metals to a powder alloy base to modify its expansion coefficient;

(c) Since the joining material is not limited to a thin film as in ordinary brazing, a layer of appreciable thickness on the order of one-quarter inch or more can be built up, and thus act as a "cushion" between hard metal and shank material.

Certain present preferred embodiments of the invention are illustrated in the accompanying drawings, in which:

FIGURE 1 is a vertical cross section of a mold assembly for the production of the bit shown in FIGURES 2 and 3;

FIGURE 2 is a plan view of a carbide tipped mining bit for blast hole drilling, provided with four carbide tips;

FIGURE 3 is an elevation of the bit shown in FIGURE 2;

FIGURE 4 is a cross section similar to FIGURE 3 for the production of a steel punch with a carbide nib;

FIGURE 5 is an elevation of a circular slitter knife used for slitting sheet steel, wherein the periphery is a ring of tungsten carbide, bonded to a metal core;

FIGURE 6 is a plan of the knife of FIGURE 5; and

FIGURE 7 is a cross section of apparatus used in the production of the slitter knife shown in FIGURES 5 and 6.

Referring to FIGURE 1, a mold assembly comprises a die barrel 1, a lower plunger 2 and a threaded steel shank serving as the upper plunger 3. The recesses in the lower plunger accommodate preformed tungsten carbide cutting tips 4 which, when the composite cutter is finished, appear in their predetermined location in the cutting tool shown in FIGURES 2 and 3. Of course, depending on the complexity and shape of the final cutter to be formed, the interior of the die may be suitably raised for the receipt of a different number and placement of hard metal tips than those illustrated herein. Either or both of the plungers 2 and 3 may be movable, and conventional high pressure means may be provided to apply the required amount of pressure to the movable part or parts of the mold. The mold may be of a suitable heat resistant alloy or ceramic or of carbon and where necessary, may be reinforced. It is generally preferred in the present process, to use disposable graphite carbon molds. The four tungsten carbide tips or bodies 4 of the desired grade are placed into the recesses of the lower plunger. For formation of the holding material 5 to bond to the tungsten carbide and to the steel shank, the following mixture by weight of metal powders is placed in the cavity of the mold:

(a) Steel or iron base powder comprising
70% iron powder and
30% cast iron powder containing 3 to 3.5% carbon
(b) Tungsten carbide powder The metal powders (a) and (b) are mixed in desired proportions to give 40 to 60% of tungsten carbide by weight, depending upon the exact coefficient of expansion and hardness required for the particular mining bit as determined primarily by the coefficients of expansion of the steel body and the tungsten carbide body. It is preferred that alloy formed from the mixture of powder metals have a coefficient of expansion substantially midway between the coefficient of expansion of the steel shank body and that of the cemented carbide body.

The steel shank 3 is inserted into the die cavity, its lower end being in contact with the upper surface of the metal powder mixture 5. The whole assembly is placed into the hot press.

Heating of the closed, relatively airtight die assembly may be accomplishred by any suitable means. The preferred method is to place the die in the interior of an induction coil of a suitable high frequency converter. Carbon dies may be connected to a high current welding type transformer. If desired, a simple pot furnace may be used, in which case the heating normally takes place at a relatively slow rate.

As the temperature is raised, pressure of from about 500 to about 3000 lbs. per square inch is applied through the upper plunger to the metal powder. The compression of the powder can be measured with a suitable gage or dial indicator. When the powder alloy materials described above are used, the compression rate increases rapidly as the melting temperature (about 2100° F.) of the cast iron powder is attained due to the plasticity of the powdered mass. The end of the molding cycle may be determined by measurement of the compression or by the temperature within the mold. When the compression has reached the point indicating that the powder has been compacted to a solid mass, the temperature is normally in the range from about 2250° F. to about 2400° F. for the stated mixture.

The mold assembly is removed from the hot press and allowed to cool. The composite molded bit is then removed and finish grinding operations may be performed on the assembly if required. The finished jack bit 6 is shown in FIGURES 2 and 3. The hard-metal inserts 4 are embedded in predetermined locations, extending in directions 90° apart, within and extending from the bonding mass 5. The cutting tips extend from the shoulders 7. The entire body 6 of the jack bit is a composite unit. A control aperture is formed by the insertion of core rod 9 as seen in FIGURE 1.

Carbide tipped jack bits produced in this manner have been used for drilling very hard rock formations without disruption of the bond between the steel and the carbide. The action of hot pressing the metal powder against the carbide produces a bond which is much stronger than the carbide itself. In laboratory tests, and in actual commercial practice, it was found that the carbide could be sheared under load without breaking away from the bonding material, whereas with tools made by the prior art methods referred to above, the tungsten carbide broke away from the steel at the bonding interface. The bonding material used had a hardness of about 45 Rockwell C and showed excellent resistance to abrasion.

A further embodiment of this invention is illustrated in FIGURE 4 by the formation of an annular die punch having one end faced with tungsten carbide.

In this particular application, a tough intermediate cushion with resistance to compression was required between the tungsten carbide ring and the steel shank.

The carbide ring 11 is placed over a core rod 12 and above a lower pressing plunger 13. This assembly is centered in the die barrel 14 and the following powder mixture 15 is poured to desired height over the carbide ring and around the core rod:

Parts by weight
Iron powder _____ 30
Nickel powder _____ 15
50/50 manganese-nickel alloy powder _____ 15
Tungsten carbide powder _____ 40

The steel shank 16 is positioned over the powder in the cavity, and the assembly transferred to the hot press. The hot pressing procedure is similar to that used for the mining bit except that the final temperature (about 2150° F.) is slightly lower, as the nickel-manganese alloy powder forms a liquid phase at a lower temperature (about 1900° F.) than the cast iron.

After cooling, the part is removed from the mold and ground to final dimensions and finish. The resulting punch replaced hardened steel punches at great increase in life. It had previously been considered impossible to use a carbide tipped punch, because carbide rings which were brazed onto the steel cracked or broke off in service. In evaluating the bond between the carbide ring-powder alloy and steel shank, in which the powder metal alloy was in the form of an intermediate layer or cushion about one-quarter inch thick, a punch produced in this manner had a radial load applied to it until the ring was compressed to an ellipse and finally until it was pressed flat. The carbide ring, while cracked in many places because it is a brittle material, nevertheless was still securely joined to the bonding metal and the latter to the steel. A similar ring conventionally brazed onto steel snapped off before the steel could be deformed even to its elastic limit. In service the intermediate cushion layer of our invention showed sufficient rigidity to withstand normal use.

Another example of an application of our invention is illustrated in FIGURES 5 and 6, namely a slitter knife which is used in a gang slitter for cutting strips of sheet steel or other materials in sheet form. It consists of an external carbide ring 21 and an internal core 22 of hot pressed powder alloy. A keyway 23 is provided for locking the knife in operating position. In this example the knife consists of these two materials only. It is desirable that the core material be strong, yet soft enough to be easily ground or machined for purposes of undercutting the core surface if desired, as well as easy boring or reaming of a center hole for assembly.

FIGURE 7 is a cross-section of the mold assembly ready for hot pressing. A carbide ring 31 is placed inside of the die barrel 33 atop a lower plunger 34. A spacer ring 35 is placed on top of the carbide ring. A core rod 36 is positioned and the powder alloy charge 32 is spread in the cavity. The upper plunger 37 is positioned, and the assembly placed in the hot press. The pre-formed carbide ring preferably is provided with a tapered surface 38 adjacent the powder charge 32. This taper or oblique surface affords increased compaction of the powder charge during axial pressure application between the upper and lower plungers because of the application of a vector component of force operating radially against the powder mass or charge. Pressure of 2000 to 4000 p.s.i. is applied to the upper plunger while the assembly is heated to the desired temperature. Under heat and pressure, the powder mass is compacted, and the powder charge has been so calculated and measured that at the completion of the hot pressing cycle, the height of the compacted powder is equal (approximately) to that of the carbide ring. As a result of this compaction a bond is obtained between the inside diametral surface of the carbide ring and the outside diametral surface of the compacted alloy powder.

In one such slitter knife, the powder alloy mixture used was as follows:

Percent by weight
Iron powder _____ 45
Nickel powder _____ 35
Cobalt powder _____ 5
Chromium powder _____ 5
50/50 nickel/manganese alloy powder _____ 10

When used for the core material for a slitter knife after hot pressing at 2000–4000 p.s.i. and temperature up to about 2150° F., the core had a hardness of approximately 70 on the Rockwell B scale. Such a slitter knife, machined to finished dimensions replaced a steel slitter for sheet steel and ran considerably longer than the steel slitter before sharpening of the cutting corners was required. The coefficient of expansion of the core was sufficiently close to that of the carbide ring, that no separation between the two metals occurred, and the carbide ring did not crack. Previous attempts to use carbide for this application failed, because, among other reasons, a solid carbide disc was too costly and too difficult to finish, and it was impossible to braze a carbide ring onto a steel core without cracking the ring.

It can thus be seen that powder alloys of various coefficients of expansion and various physical and mechanical properties can be produced by the method demonstrated and bonded to tungsten carbide. The alloys can be attached and bonded directly to the flat carbide surfaces or to the inside or outside diameters of carbide rings, with or without using regular steel mating parts.

Other examples of parts successfully produced in accord with this invention are carbide tipped milling cutters and other tools where carbide is attached to steel shanks, carbide lined dies, with carbide cavities surrounded by powder alloy and steel, carbide tipped shears, carbide covered mixing blades, etc.

Whereas certain typical applications of the invention have been shown and described herein, it is obvious that the process may be applied wherever it is desirable to join cemented carbide to steel. Also, it is to be understood that a variety of alloys may be produced from metal powder and joined to hard metal by this process, and the process is not necessarily limited to the particular powdered metal steels used for illustration.

It would ordinarily be expected by those skilled in this art that the cemented carbide component of the finished product or of the intermediate bonded product would be extremely brittle and would be subject to cracking off and susceptible of breakage or chipping or cracking or of loosening the bond. On the contrary, actual experience with the products of the invention has demonstrated that the composite product has great strength and ductility and is not brittle as would have been predicted. A synergistic effect of strength, not alone of the combined strength of the two components inherent in each of them, is achieved, and exceeds that combined strength. The bond has withstood strength tests even where the base or the hard metal face has chipped or broken or cracked or pulled apart.

The invention further includes the manufacture of an article having a hard surfaced outer portion or section. Thus, a body of hard surface material, such as tungsten carbide, may be bonded to a strong metal, for example a steel tool body or tool handle, by hot pressing an assembly comprising such tungsten carbide part or section together with the steel in association with a mixture of the hard surface material powder and of the alloy bond powder. This latter powdered material may act in a sense as an intermediate bonding layer and when such materials having different coefficients of expansion are used, they should be used in such proportion that the common or average or resultant coefficient of expansion should be approximately half way or midway between the respective inherent coefficients of expansion of the respective component powders of the intermediate powdered bonding compound or layer.

According to the invention, where a composite powder comprises strong metal powder (as, for example, steel powder) and hard metal powder (as, for example, tungsten carbide powder), it is preferred that the strong metal powder be volumetrically greater in the mixture than the hard metal powder, particularly when a volume of substantial thickness is involved.

While certain preferred embodiments of the invention have been shown and described, it is to be understood that the invention is susceptible of other embodiments, and the scope of the protection afforded is to be measured only by the appended claims.

What is claimed is:

1. An article comprising a steel body, a tungsten carbide body and a powder metal alloy bonding layer between said bodies, said article being produced by hot pressing a powder metal alloy while in contact with said steel body and said carbide body at sufficient temperature below 2400° F. and sufficient pressure to produce a metallurgically bonded joint between said steel body and said powder metal layer on one interface and between said carbide body and said powder metal layer on the other interface, said powder metal alloy consisting essentially of tungsten carbide powder and metal powder selected from the group consisting of iron powder, nickel powder and cobalt powder and combinations of those metal powders and inter-alloys thereof, said tungsten carbide powder comprising between about 40% and 60% of the total weight of said metal powder alloy.

2. The method of making a composite article of tungsten carbide and steel which comprises placing a preformed body of tungsten carbide and a pre-formed body of steel into a mold, placing a metal alloy powder into the mold between said bodies, said metal powder consisting essentially of iron powder and tungsten carbide powder, said tungsten carbide powder comprising between about 40% and 60% of the weight of said metal powder and applying heat below 2400° F. and pressure.

3. An article comprising a steel body, a hard metal body consisting essentially of at least one member selected from the group consisting of the carbides, nitrides, borides and silicides of a metal selected from the group consisting of titanium, tungsten, tantalum, zirconium, chromium and molybdenum, and a powder metal alloy layer positioned between said bodies and bonding the same together, said article being produced by hot pressing a powder metal alloy layer while in contact with said steel body and said hard metal body at sufficient temperature below 2400° F. and sufficient pressure to produce a metallurgically bonded joint between said steel body and said powder metal layer on one interface and between said hard metal body and said powder metal layer on the other interface, said powder metal alloy layer consisting essentially of not less than about 30% by weight of a powder of said hard metal, the balance of said powder metal alloy being selected from the group consisting of iron powder, nickel powder, chromium powder, manganese powder, cobalt powder, combinations of these metal powders and inter-alloys thereof.

4. An article according to claim 3 wherein said hard metal powder is tungsten carbide.

5. An article comprising a steel body, a hard metal body consisting essentially of at least one member selected from the group consisting of the carbides, nitrides, borides and silicides of a metal selected from the group consisting of titanium, tungsten, tantalum, zirconium, chromium and molybdenum, and a powder metal alloy layer positioned between said bodies and bonding the same together, said article being produced by hot pressing a powder metal alloy layer while in contact with said steel body and said hard metal body at sufficient temperature below 2400° F. and sufficient pressure to produce a metallurgically bonded joint between said steel body and said powder metal layer on one interface and between said hard metal body and said powder metal layer on the other interface, said powder metal alloy layer consisting essentially of a carbide powder and metal powder selected from the group consisting of iron powder, nickel powder, chromium powder, manganese powder, cobalt powder, combinations of these metal powders and inter-alloys thereof, said carbide powder comprising between about 40% and 60% of the total weight of said metal powder alloy.

6. An article according to claim 5 wherein said carbide powder is selected from the group consisting of tantalum, titanium and tungsten.

7. An article comprising a steel body, a titanium carbide body and a powder metal alloy bonding layer between said bodies, said article being produced by hot pressing a powder metal alloy layer while in contact with said steel body and said carbide body at sufficient temperature below 2400° F. and sufficient pressure to produce a metallurgically bonded joint between said steel body and said metal layer on one interface and between said carbide body and said powder metal layer on the other interface, said powder metal alloy layer consisting essentially of titanium carbide powder and metal powder selected from the group consisting of iron powder, nickel powder, chomium powder, manganese powder, cobalt powder, combinations of these metal powders and inter-alloys thereof, said titanium carbide powder comprising between about 40% and 60% of the total weight of said metal powder alloy.

8. An article comprising a steel body, a tantalum carbide body and a powder metal alloy bonding layer between said bodies, said article being produced by hot pressing a powder metal alloy layer while in contact with said steel body and said carbide body at sufficient temperature below 2400° F. and sufficient pressure to produce a metallurgically bonded joint between said steel body and said metal layer on one interface and between said carbide body and said powder metal layer on the other interface, said powder metal alloy layer consisting essentially of tantalum carbide powder and metal powder selected from the group consisting of iron powder, nickel powder, chromium powder, manganese powder, cobalt powder, combinations of these metal powders and inter-alloys thereof, said tantalum carbide powder comprising between about 40% and 60% of the total weight of said metal powder alloys.

9. The method of making a composite article of a steel body and a hard metal body consisting essentially of at least one member selected from the group consisting of the carbides, nitrides, borides and silicides of a metal selected from the group consisting of titanium, tungsten, tantalum, zirconium, chromium and molybdenum which comprises placing a preformed body of said hard metal and a preformed body of the said steel into a mold, placing a metal alloy powder layer into the mold between said bodies, said metal powder alloy layer consisting essentially of not less than about 30% by weight of a powder of said hard metal, the balance of said powder being selected from the group consisting of iron powder, nickel powder, chromium powder, manganese powder, cobalt powder, combinations of these metal powders and inter-alloys thereof, and applying heat below 2400° F. and pressure.

10. The method of making a composite article of a steel body and a hard metal body consisting essentially of at least one member selected from the group consisting of the carbides, nitrides, borides and silicides of a metal selected from the group consisting of titanium, tungsten, tantalum, zirconium, chromium and molybdenum which comprises placing a preformed pellet of metal alloy powder between a preformed body of said hard metal and a preformed body of said steel, said metal powder alloy consisting essentially of not less than about 30% by weight of a powder of said hard metal, the balance of said powder being selected from the group consisting of iron powder, nickel powder, chromium powder, cobalt powder, combinations of these metal powders and inter-alloys thereof, and applying heat below 2400° F. and pressure.

11. The method of making a composite article of a steel body and a hard metal body consisting essentially of at least one member selected from the group consisting of the carbides, nitrides, borides and silicides of a metal selected from the group consisting of titanium, tungsten, tantalum, zirconium, chromium and molybdenum which comprises placing a preformed body of said hard metal and a preformed body of steel into a mold, placing a metal alloy powder layer into the mold between said bodies, said metal powder alloy layer consisting essentially of a carbide powder and metal powder selected from the group consisting of iron powder, nickel powder, chromium powder, manganese powder, cobalt powder, combinations of these metal powders and inter-alloys thereof, said carbide powder comprising between about 40% and 60% of the total weight of said metal powder alloy, and applying heat below 2400° F. and pressure.

12. The method of making a composite article of a steel body and a titanium carbide body which comprises placing a preformed body of said titanium carbide and a preformed body of said steel into a mold, placing a metal alloy powder layer into the mold between said bodies, said powder metal alloy layer consisting essentially of titanium carbide powder and metal powder selected from the group consisting of iron powder, chromium powder, manganese powder, nickel powder, cobalt powder, combinations of these powders and inter-alloys thereof, said titanium powder comprising between about 40% and 60% of said metal powder alloy, and applying heat below 2400° F. and pressure.

13. The method of making a composite article of a steel body and a tantalum carbide body which comprises placing a preformed body of said tantalum carbide and a preformed body of said steel into a mold, placing a metal alloy powder layer into the mold between said bodies, said metal alloy powder layer consisting essentially of tantalum carbide powder and metal powder selected from the group consisting of iron powder, nickel powder, chromium powder, manganese powder, cobalt powder, combinations of these metal powders and inter-alloys thereof, said tantalum carbide powder comprising between about 40% and 60% of the total weight of said metal powder alloy, and applying heat below 2400° F. and pressure.

References Cited in the file of this patent

UNITED STATES PATENTS

| | | |
|---|---|---|
| 1,858,244 | Laise | May 17, 1932 |
| 1,904,568 | Taylor | Apr. 18, 1933 |
| 1,941,283 | Taylor | Dec. 26, 1933 |
| 2,068,848 | De Bats | Jan. 26, 1937 |
| 2,178,527 | Wellman | Oct. 31, 1939 |
| 2,191,666 | Keiffer | Feb. 27, 1940 |
| 2,228,235 | Pfanstiehl | Jan. 7, 1941 |
| 2,317,786 | Lubbe | Apr. 27, 1943 |
| 2,410,512 | Lindqvist | Nov. 5, 1946 |
| 2,414,231 | Kraus | Jan. 14, 1947 |
| 2,439,570 | Hensel | Apr. 13, 1948 |
| 2,455,183 | Lobdell | Nov. 30, 1948 |
| 2,575,808 | Halverson | Nov. 20, 1951 |

FOREIGN PATENTS

| | | |
|---|---|---|
| 589,774 | Great Britain | June 30, 1947 |
| 494,300 | Great Britain | Oct. 20, 1938 |
| 394,193 | Great Britain | June 22, 1933 |